US009495746B2

(12) United States Patent
Chou et al.

(10) Patent No.: US 9,495,746 B2
(45) Date of Patent: Nov. 15, 2016

(54) METHODS, SYSTEMS, AND COMPUTER READABLE MEDIA FOR REAL-TIME 2D/3D DEFORMABLE REGISTRATION USING METRIC LEARNING

(71) Applicant: The University of North Carolina at Chapel Hill, Chapel Hill, NC (US)

(72) Inventors: Chen-Rui Chou, Raleigh, NC (US); Stephen Pizer, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 0 days.

(21) Appl. No.: 14/776,873

(22) PCT Filed: Mar. 14, 2014

(86) PCT No.: PCT/US2014/028251
§ 371 (c)(1),
(2) Date: Sep. 15, 2015

(87) PCT Pub. No.: WO2014/144019
PCT Pub. Date: Sep. 18, 2014

(65) Prior Publication Data
US 2016/0012592 A1    Jan. 14, 2016

Related U.S. Application Data

(60) Provisional application No. 61/789,000, filed on Mar. 15, 2013.

(51) Int. Cl.
*G06T 7/00*    (2006.01)
*G06T 11/00*   (2006.01)
*G06T 15/08*   (2011.01)

(52) U.S. Cl.
CPC .......... *G06T 7/0034* (2013.01); *G06T 7/0028* (2013.01); *G06T 7/0032* (2013.01);
(Continued)

(58) Field of Classification Search
CPC ................. G06T 17/00; G06T 15/08; G06T 2207/10072; G06T 2207/10116; G06T 2207/10136; G06T 7/2046; G06T 11/003; G06T 7/0034; G06T 7/0032; G06T 7/0028
See application file for complete search history.

(56) References Cited

U.S. PATENT DOCUMENTS

| 5,926,568 A | 7/1999 | Chaney et al. |
| 6,690,816 B2 | 2/2004 | Aylward et al. |

(Continued)

FOREIGN PATENT DOCUMENTS

WO    WO 2011/156526 A2    12/2011

OTHER PUBLICATIONS

Notification of Transmittal of the International Search Report and the Written Opinion of the International Searching Authority, or the Declaration for International Application No. PCT/US2014/028251 (Aug. 22, 2014).

(Continued)

*Primary Examiner* — Vu Le
*Assistant Examiner* — Kenny Cese
(74) *Attorney, Agent, or Firm* — Jenkins, Wilson, Taylor & Hunt, P.A.

(57) ABSTRACT

Methods, systems, and computer readable media for real-time 2D/3D deformable registration using metric learning are disclosed. According to one aspect, a method for real-time 2D/3D deformable registration using metric learning includes creating a catalog of simulated 2D projection images based on a reference 3D image and a shape space of 3D deformations, where each entry in the catalog is created by: applying to the reference 3D image a set of deformation parameters from the shape space of deformations; simulating a 2D projection of the result; associating the simulated 2D projection image with the deformation parameters used to create the simulated 2D projection image; and storing the simulated 2D projection image and associated deformation parameters in the catalog. The method also includes receiving a 2D image, and, in response to receiving the 2D image: calculating a value of distance between the received 2D image and a simulated 2D projection image for each of the simulated 2D projection images in the catalog; using the calculated distances to calculate weighting factors to be applied to the deformation parameters of each of the simulated 2D projection images in the catalog; and calculating deformation parameters for the received 2D image based on the weighted deformation parameters in the catalog. The calculated deformation parameters are then used to deform a 3D volume of interest to produce a 3D volume that represents the 3D layout of the tissue at the time that the received 2D image was acquired.

28 Claims, 11 Drawing Sheets

(52) U.S. Cl.
CPC ............. *G06T11/003* (2013.01); *G06T 15/08* (2013.01); *G06T 2200/04* (2013.01); *G06T 2207/10081* (2013.01); *G06T 2207/20016* (2013.01); *G06T 2207/20076* (2013.01); *G06T 2207/20081* (2013.01); *G06T 2207/20116* (2013.01); *G06T 2207/30024* (2013.01); *G06T 2207/30061* (2013.01); *G06T 2207/30096* (2013.01); *G06T 2211/428* (2013.01)

(56) References Cited

U.S. PATENT DOCUMENTS

| | | | |
|---|---|---|---|
| 7,200,251 | B2 | 4/2007 | Joshi et al. |
| 8,666,128 | B2 | 3/2014 | Chaney et al. |
| 2005/0180544 | A1 | 8/2005 | Sauer et al. |
| 2009/0180678 | A1 | 7/2009 | Kuduvalli et al. |
| 2012/0008734 | A1 | 1/2012 | Thomson et al. |
| 2012/0027278 | A1 | 2/2012 | Chaney et al. |
| 2012/0314927 | A1* | 12/2012 | Chen .................. G06T 11/006 382/131 |

OTHER PUBLICATIONS

Russakoff et al., "Fast Intensity-Based 2D-3D Image Registration of Clinical Data Using Light Fields," Proceedings of the Ninth IEEE International Conference on Computer Vision, vol. 1, pp. 1-7 (2003).

Russakoff et al., "Fast Generation of Digitally Reconstructed Radiographs Using Attenuation Fields with Application to 2D-3D Image Registration," IEEE Transactions on Medical Imaging, vol. 24, No. 11, pp. 1441-1454 (Nov. 2005).

Khamene et al., "Automatic registration of portal images and volumetric CT for patient positioning in radiation therapy," Medical Image Analysis 10, pp. 96-112 (2006).

Munbodh et al., "Automated 2D-3D registration of a radiograph and a cone beam CT using line-segment enhancement," Medical Physics 33, pp. 1-27 (2006).

Li et al., "Real-time volumetric image reconstruction and 3D tumor localization based on a single x-ray projection image for lung cancer radiotherapy," Medical Physics 37, pp. 1-8 (2010).

Li et al., "3D tumor localization through real-time volumetric x-ray imaging for lung cancer radiotherapy," Medical Physics 38, pp. 1-21 (2011).

Chou et al., "A Learning-Based Patient Repositioning Method from Limited-Angle Projections," In: Brain, Body and Machine, vol. 83 of Advances in Intelligent and Soft Computing, Springer, pp. 83-94 (2010).

Chou et al., "CLARET: A Fast Deformable Registration Method Applied to Lung Radiation Therapy," In: Fourth International (MICCAI) Workshop on Pulmonary Image Analysis, pp. 1-12 (2011).

Miao et al., "A Hybrid Method for 2-D/3-D Registration Between 3-D Volumes and 2-D Angiography for Trans-Catheter Aortic Valve Implantation (TAVI)," In: IEEE International Symposium on Biomedical Imaging (ISBI) pp. 1215-1218 (2011).

Weinberger et al., "Metric Learning for Kernel Regression," In: Eleventh International Conference on Artificial Intelligence and Statistics, pp. 1-8 (2007).

Lorenzen et al., "Multi-Modal Image Set Registration and Atlas Formation," Medical Image Analysis Journal 10(3), pp. 1-24 (2006).

\* cited by examiner

METHODS, SYSTEMS, AND COMPUTER READABLE MEDIA FOR REAL-TIME 2D/3D DEFORMABLE REGISTRATION USING METRIC LEARNING

PRIORITY CLAIM

This application claims the benefit of U.S. Provisional Patent Application Ser. No. 61/789,000, filed Mar. 15, 2013; the disclosure of which is incorporated herein by reference in its entirety.

GOVERNMENT INTEREST

This invention was made with government support under Grant No. CA128510 awarded by the National Institutes of Health. The government has certain rights in the invention.

TECHNICAL FIELD

The subject matter described herein relates to methods and systems for registration of 2D projection images to 3D volume images for use during real-time image-guided radiation therapy (IGRT) or any other real-time image-guided remote therapy. More particularly, the subject matter described herein relates to methods, systems, and computer readable media for real-time 2D/3D deformable registration using metric learning.

BACKGROUND

Tumor localization in 3D is the main goal of IGRT. Another important goal is the localization of non-cancerous objects at risk to radiation. They are usually accomplished by computing the patient's treatment-time 3D deformations based on an on-board imaging system, which is usually an x-ray based system. The treatment-time 3D deformations can be computed by doing image registration between the treatment-time reconstructed 3D image and the treatment-planning 3D image (3D/3D registration) or between the treatment-time on-board 2D projection images and the treatment-planning 3D image (2D/3D registration).

Recent advances of the IGRT registration methods emphasize real-time computation and low-dose image acquisition. Russakoff et al. [1,2], Khamene et al. [3], Munbodh et al. [4], Li et al. [5,6] rejected the time-consuming 3D/3D registration and performed 2D/3D registration by optimizing similarity functions defined in the projection domain. Other than the optimization-based methods, Chou et al. [7,8] recently introduced a faster and low-dose 2D/3D image registration by using a linear operator that approximates the deformation parameters. However, all of the above registration methods involve computationally demanding production of Digitally-Reconstructed Radiographs (DRRs) in each registration iteration (e.g., 15 ms on a modern GPU to produce a 256×256 DRR from a 256×256×256 volume [9]), which makes them difficult to be extended to support real-time (>30 fps) image registration.

Accordingly, there exists a need for real-time 2D/3D deformable registration that is fast, accurate, and robust. More specifically, there exists a need for metric-learning enabling real-time 2D/3D deformable registration.

SUMMARY

According to one aspect, the subject matter described herein includes a method for real-time 2D/3D deformable registration using metric learning. The method includes creating a catalogue of simulated 2D projection images based on a reference 3D image and a shape space of 3D deformations, where each entry in the catalogue is created by applying to the reference 3D image a set of deformation parameters from the shape space of deformations, simulating a 2D projection of the result; associating the simulated 2D projection image with the deformation parameters used to create the simulated 2D projection image, and storing the simulated 2D projection image and associated deformation parameters in the catalogue. The method also includes receiving an acquired 2D image, and, in response to receiving the 2D image, calculating a value of distance between the acquired 2D image and a simulated 2D projection image for each of the simulated 2D projection images in the catalogue, using the calculated distances to calculate weighting factors to be applied to the deformation parameters of each of the simulated 2D projection images in the catalogue, and calculating 3D deformation parameters inferred from the acquired 2D image based on the weighted 3D deformation parameters in the catalogue. The calculated deformation parameters are then used to deform a 3D volume of interest to produce a 3D volume that represents the 3D layout of the tissue at the time that the received 2D image was acquired.

The method also includes two approaches that learn the distance metrics used in computing the distances between 2D images. The first approach uses linear regressions to learn the relationship between Euclidean inter-projection-image distance metrics and the respective 3D deformation parameter values. The second approach uses a leave-one-out strategy that optimizes, over Riemannian metrics, the accuracy of the prediction of the 3D deformation parameter values of the left-out projection images.

According to another aspect, the subject matter described herein includes a system for real-time 2D/3D deformable registration using metric learning. The system includes a data store for storing a catalogue of simulated 2D projection images that were created based on a reference 3D image and a shape space of 3D deformations, wherein each entry in the catalogue was computed by applying to the reference 3D image a set of deformation parameters from the shape space of deformations, simulating a 2D projection of the result; associating the simulated 2D projection image with the deformation parameters used to create the simulated 2D projection image, and storing the simulated 2D projection image and associated deformation parameters in the catalogue. The system also includes a hardware module for receiving an acquired 2D image, and, a software module that, in response to receiving the 2D image, calculates a value of distance between the acquired 2D image and a simulated 2D projection image for each of the simulated 2D projection images in the catalogue, uses the calculated distances to calculate weighting factors to be applied to the deformation parameters of each of the simulated 2D projection images in the catalogue, calculates 3D deformation parameters inferred from the acquired 2D image based on the weighted deformation parameters in the catalogue, and uses the calculated deformation parameters to deform a 3D volume of interest to produce a 3D volume that represents the 3D layout of the tissue at the time that the 2D image was acquired. The system also includes two software modules that learn the distance metrics used in computing the distances between 2D images. The first module uses linear regressions to learn the relation between Euclidean inter-projection-image distance metrics and respective 3D deformation parameter values. The second module uses a leave-one-out strategy that optimizes, over Riemannian metrics, the accuracy of the prediction of the 3D deformation parameter values of the left-out projection images.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
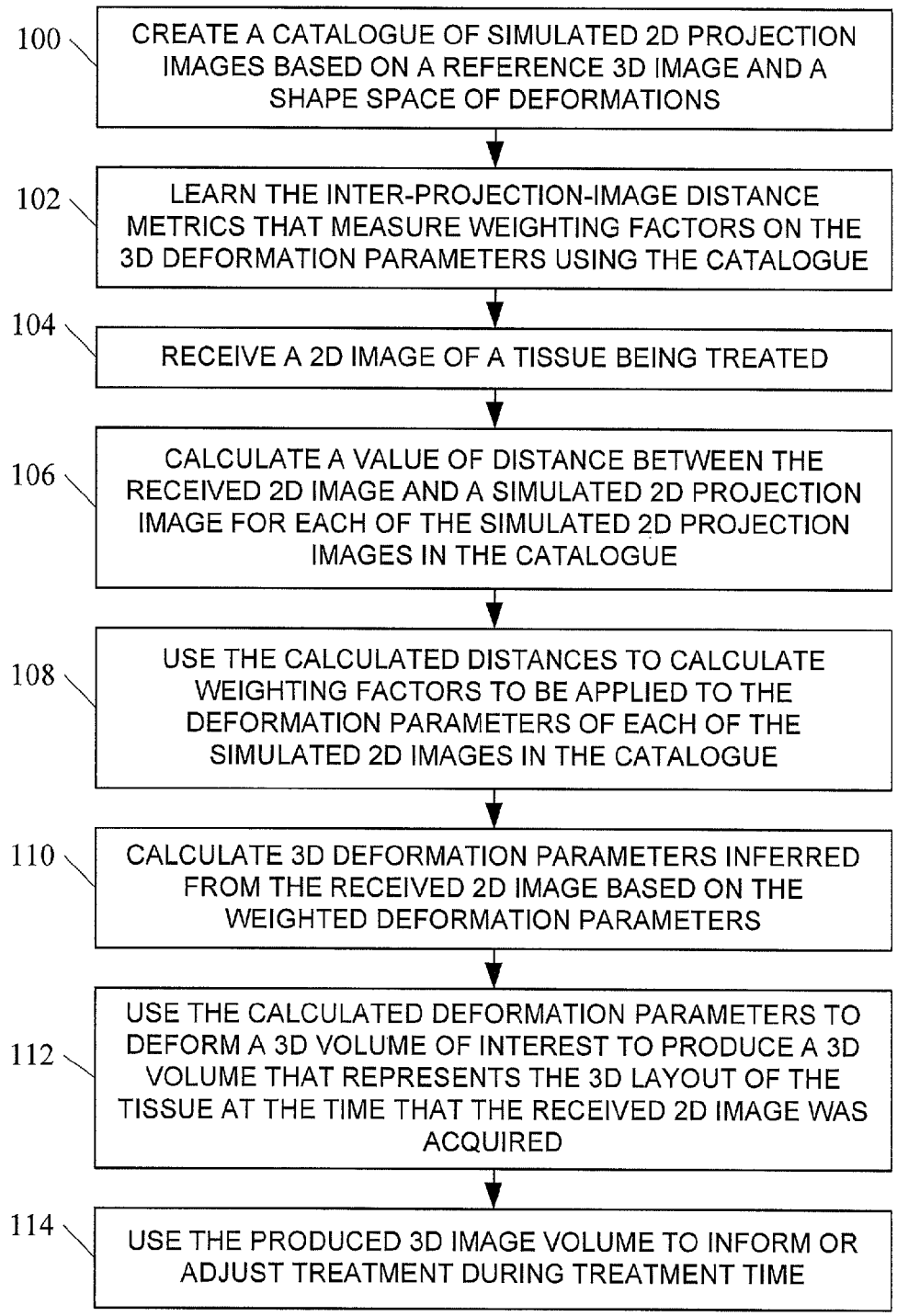
FIG. 1 is a flow chart illustrating an exemplary process for real-time 2D/3D deformable registration using metric learning according to an embodiment of the subject matter described herein.

In accordance with the subject matter disclosed herein, systems, methods, and computer readable media for real-time 2D/3D deformable registration using metric learning are provided.

We present a novel real-time 2D/3D registration method, called Registration Efficiency and Accuracy through Learning Metric on Shape (REALMS), that does not require DRR production in the registration. It calculates the patient's treatment-time 3D deformations by kernel regression. Specifically, each of the patient's deformation parameters is interpolated using a weighting Gaussian kernel on that parameter's training case values. In each training case, its parameter value is associated with a corresponding training projection image. The Gaussian kernel is formed from distances between training projection images. This distance for the parameter in question involves a Riemannian metric on projection image differences. At planning time, REALMS learns the parameter-specific metrics from the set of training projection images using a Leave-One-Out (LOO) training.

To the best of our knowledge, REALMS is the first 2D/3D deformable registration method that achieves real-time (>30 fps) performance. REALMS uses the metric learning idea firstly introduced in Weinberger and Tesauro [10] to tackle the 2D/3D image registration problem. Particularly, in order to make the metric learning work for the high dimensional ($D \gg 10^3$) projection space, REALMS uses a specially-designed initialization approximated by linear regression. The results have led to substantial error reduction when the special initialization is applied.

Given a 3D reference image, such as a computed tomography (CT) image, and a scale space of deformations, the REALMS (Registration Efficiency and Accuracy through Learning Metric on Shape) method described herein interpolatively and very quickly (a few milliseconds on a standard desktop computer) calculates a deformation in the scale space from a 2D projection image, e.g., a radiograph, consistent with the reference image. It is designed to improve radiation treatment of cancer via image-guided radiotherapy.

The subject matter described herein uses a scale space consisting of a mean deformation and a limited number of modes of variation, such that a deformation in the scale space is formed as the sum of the mean and linear combinations of the modes with mode weights given by the n-tuple $\underline{c}$ (formed by weights $c_1, c_2, \ldots c_n$).

The subject matter described herein involves computing n 2D "interest images" $A_i$, n capture distance values $\sigma_i$, and a catalogue of simulated 2D projection images $I^k$, each computed by applying the deformation determined by an associated vector $\underline{c}^k$ to the reference image and calculating a projection of the result. Then, given a new 2D image I, for each coefficient $c_i$ the method calculates the weight $w_i^k$ associated with the $i^{th}$ component of $\underline{c}^k$ as follows, and interpolates each coefficient $c_i$ as $\Sigma_{k=1}^{n} w_i^k \underline{c}_i^k / \Sigma_{k=1}^{n} w_i^k$. The weight $w_i^k$ is computed as $\exp[-0.5 \text{ distance}^2(I, I^k)/\sigma_i^2]$ e.g., as a decreasing function of the distance of I from $I^k$, with that distance computed by the Euclidean magnitude of the dot product $A_i^T(I-I^k)$.

Each interest image $A_i$ is computed as the regression matrix linearly predicting $c^i$ from the images $J-I^k$, where J ranges over all of the images $I^j$ and k ranges over all images in the catalogue but the $j^{th}$. The capture distance $\sigma_i$ is selected to yield a minimum average error magnitude in the $\underline{c}_i^k$ over all images in the catalogue. $A_i$ can also be optimized using an objective function made from some norm of the REALMS prediction accuracies of the catalogue $\underline{c}_j^k$ values.

A multiscale version with successive locality in either or both spatial region of interest and coefficient $c_i$ region of interest can increase the accuracy of the method, at the expense of some of its speed.

Reference will now be made in detail to exemplary embodiments of the present invention, examples of which are illustrated in the accompanying drawings. Wherever possible, the same reference numbers will be used throughout the drawings to refer to the same or like parts.

FIG. 1 is a flow chart illustrating an exemplary process for real-time 2D/3D deformable registration using metric learning according to an embodiment of the subject matter described herein.

Step 100 includes creating a catalogue of simulated 2D projection images based on a reference 3D image and a shape space of deformations. In one embodiment, the reference 3D image is a 3D image of a tissue to be treated, usually taken before treatment time, during a planning stage. The process of creating the catalogue will be described in more detail in FIG. 2, below.

Step 102 includes learning the inter-projection-image distance metrics that measure weighting factors on the 3D deformation parameters using the catalogue. In one embodiment, the learned projection metrics may be learned by performing linear regressions to learn the relation between Euclidean inter-projection-image distance metrics and respective 3D deformation parameter values. In another embodiment, the learned projection metrics may be learned by performing a leave-one-out analysis, over Riemannian metrics, the accuracy of the prediction of the 3D deformation parameter values of the left-out projection images.

At step 104, a 2D image is received, which may be a 2D image of a tissue being treated, acquired at treatment time.

At step 106, a distance value is calculated between the received 2D image and each of the simulated 2D projection images in the catalogue. In one embodiment, the distance value is calculated as a difference between the received 2D image and a 2D image from the catalogue, calculated on a pixel-by-pixel basis. In one embodiment, the distance value equals the sum of the differences between the intensity value of a pixel on one image and the intensity value of the corresponding pixel on the other image. In alternative embodiments, other distance functions may be used, including comparing groups of pixels, where the comparison may be weighted or un-weighted, and so on. In one embodiment, a distance value is calculated for each image in the catalogue. Alternatively, a distance value may be calculated for a select subset of images in the catalogue.

At step 108, the calculated distances are used to calculate weighting factors to be applied to the deformation parameters for each of the simulated 2D projection images in the catalogue, and at step 110, the weighted deformation parameters for each of the 2D images in the catalogue are used to calculate 3D deformation parameters inferred from the received 2D image. In this manner, the deformation parameters for catalogue images that are more similar to the received image are given more weight than is given to the deformation parameters for catalogue images that are less similar to the received image. In one embodiment, a weighting function is used to map distance to a weighting coefficient to be applied to the deformation parameters of the catalogue image. In one embodiment, a separate weighting function may be used for each separate parameter. In one embodiment, the weighting function is determined based on analysis of the 2D projection images in the catalogue, such as by a leave-one-out analysis or regression analysis.

At step 112, the equivalent deformation parameters that were calculated for the received 2D image are applied to deform a 3D volume of interest, such as a 3D volume of a tissue being treated (or a 3D model of such tissue), to produce a 3D volume that represents the 3D layout (e.g., shape and location) of the tissue at the time that the received 2D image was acquired. If this method is used to provide real-time 2D/3D deformable registration during treatment time, then at step 114, the 3D image volume produced by step 112 is used to inform or adjust treatment during treatment time. For example, the real-time 2D/3D registration allows accurate calculation of the target or actual location within the tissue that is being treated, as well as the target or actual dose, dose accumulation, or dose exposure for the tissue being treated.

Because the methods of 2D/3D registration described herein do not require using a 3D volume to generate, at treatment time, a set of 2D simulated projection images that are then compared to the 2D images received at treatment time, as is done by conventional methods, the registration methods described herein are very fast and can perform registration and 3D volume generation at more than 30 frames per second on currently available hardware.

Figure 2:
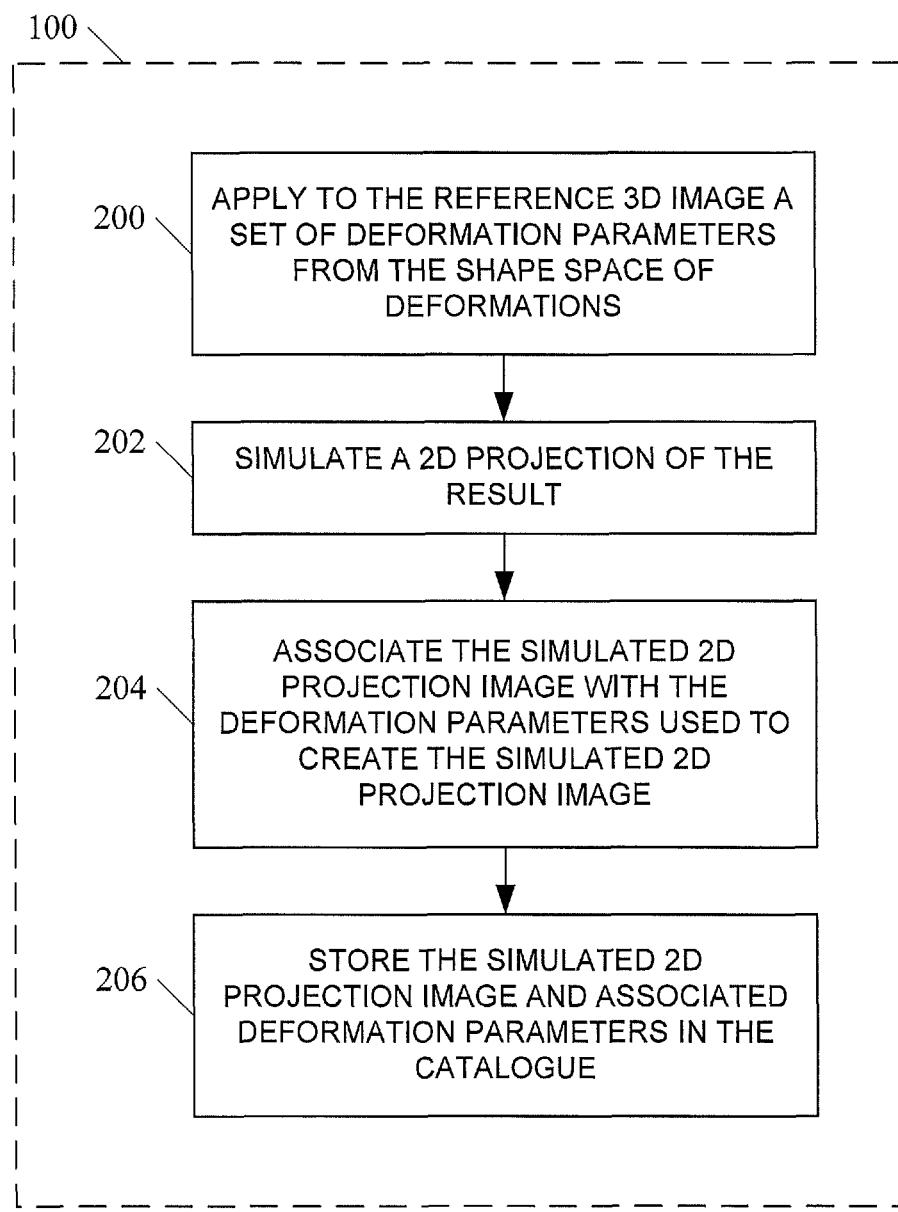
FIG. 2 is a flow chart illustrating in detail a portion of an exemplary process for real-time 2D/3D deformable registration using metric learning according to an embodiment of the subject matter described herein.

FIG. 2 is a flow chart illustrating in detail a portion of an exemplary process for real-time 2D/3D deformable registration using metric learning according to an embodiment of the subject matter described herein. FIG. 2 shows in more detail the process of creating the catalogue of simulated 3D projection images based on a reference 3D image and a shape space of deformations.

Step 200 includes applying to the reference 3D image a set of deformation parameters from the shape space of deformations. For example, if it has been determined, via principal component analysis (PCA) or some other method, that the shape space of deformations of the tissue in question can be characterized using only four deformation parameters P1, P2, P3, and P4, and that each parameter has its own range of values, then the shape space of deformations comprises a four-dimensional space, in which case N different 4-tuples of parameter values may be generated. In step 200, the set of deformation parameters would comprise one of the N different 4-tuples. Application of the particular 4-tuple deforms the 3D volume according to the particular values of the deformation parameters in the 4-tuple.

At step 202, a 2D projection of the deformed 3D image is simulated. When the catalogue of images is being generated for the purpose of providing real-time 2D/3D registration during treatment time, the 2D projections are likely to be generated at a projection angle that is essentially the same as the expected angle from which the treatment time 2D images will be taken. However, 2D projection images of the deformed 3D image may be generated using other projection angles, or from multiple projection angles.

At step 204, the simulated 2D projection image is associated with the deformation parameters used to create the simulated 2D projection image.

At step 206, the simulated 2D projection image and its associated deformation parameters are stored in the catalogue.

Figure 3:
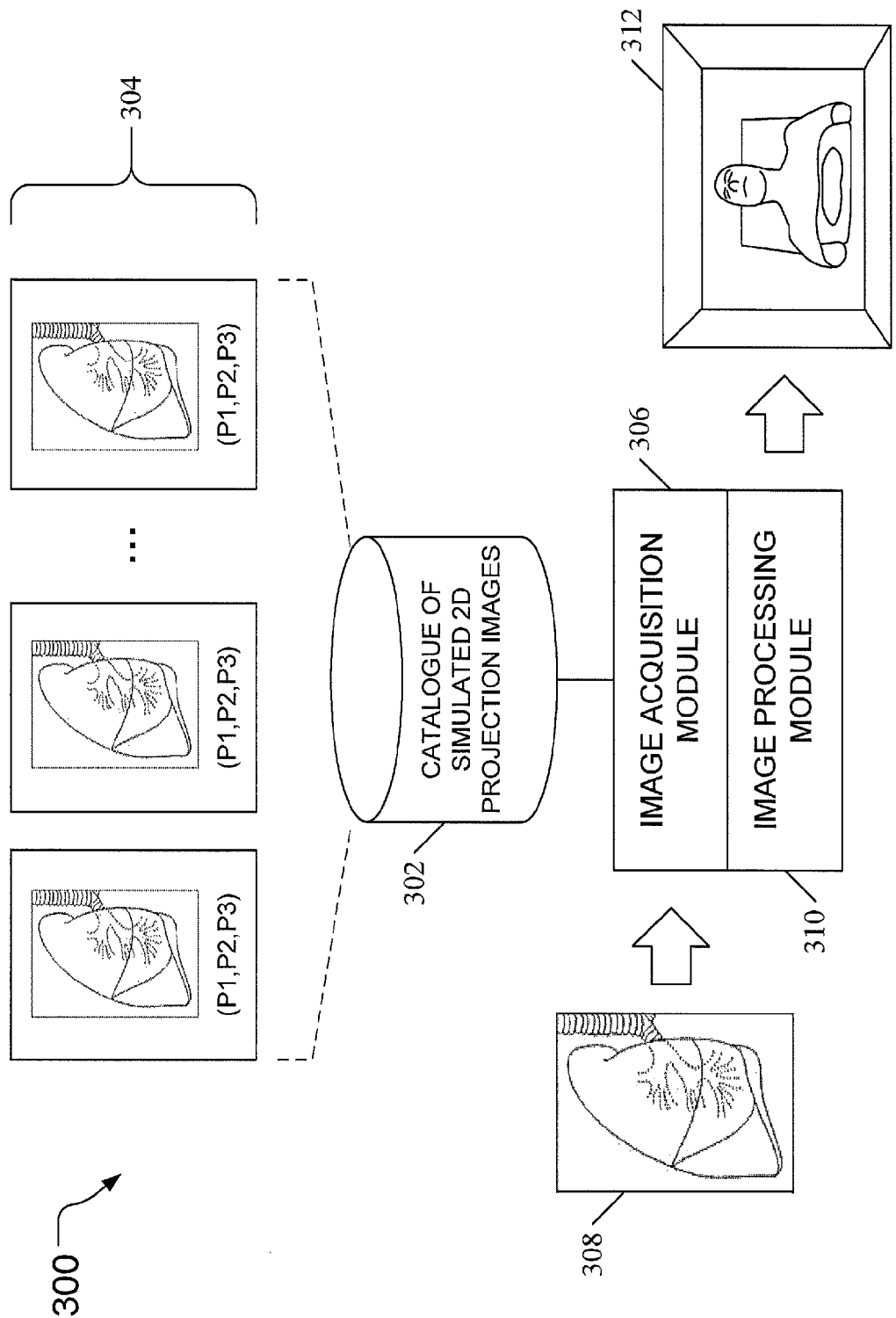
FIG. 3 is a block diagram illustrating an exemplary system for real-time 2D/3D deformable registration using metric learning according to an embodiment of the subject matter described herein.

FIG. 3 is a block diagram illustrating an exemplary system for real-time 2D/3D deformable registration using metric learning according to an embodiment of the subject matter described herein. In the embodiment illustrated in FIG. 3, system 300 includes a data store 302 for storing a catalogue of simulated 2D projection images 304. Each image in catalogue 304 has associated with it the deformation parameters that were used to simulate the 2D projection image from a reference 3D volume image. In the embodiment illustrated in FIG. 3, three deformation parameters P1, P2, and P3 are associated with each image, but other numbers of parameters may be used. The deformation parameters will be described in detail below. In the embodiment illustrated in FIG. 3, system 300 includes an image acquisition module 306 for receiving an acquired 2D image 308, which is sent to an image processing module 310 for processing according to the method illustrated in FIGS. 1 and 2 to produce a 3D volume 312 that represents the 3D layout of the tissue at the time that 2D image 308 was acquired.

The operation of REALMS will now be illustrated graphically in FIGS. 4A through 4D.

Figure 4A:
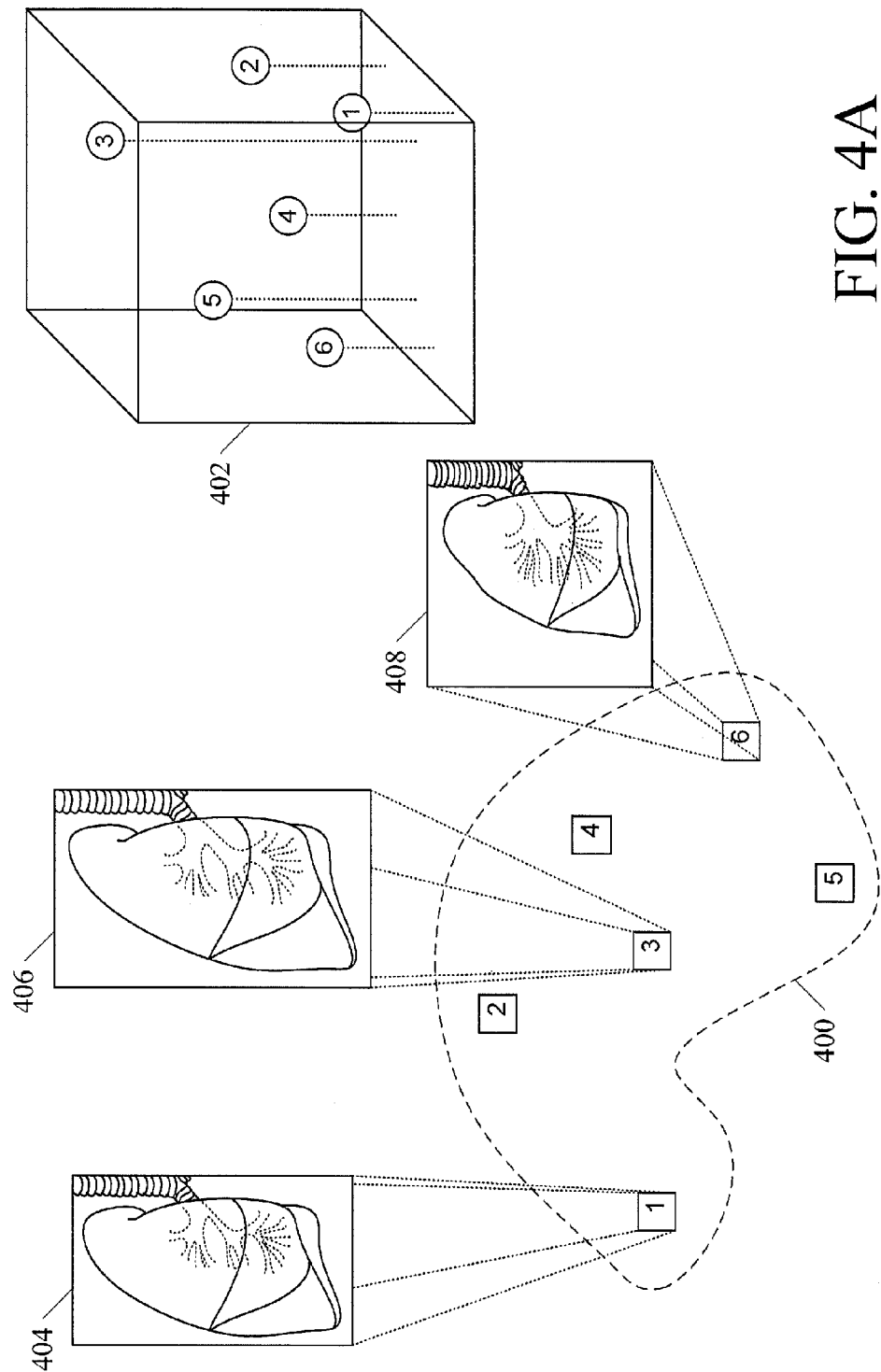
FIGS. 4A through 4D graphically illustrate the operation of the REALMS method according to an embodiment of the subject matter described herein.

FIG. 4A illustrates data that may be used by systems and methods according to an embodiment of the subject matter described herein. FIG. 4A graphically illustrates two conceptual spaces, projection space 400 and parameter space 402. Projection space 400 is a collection of training DRRs and their associated parameter values. In the embodiment illustrated in FIG. 4A, projection space 400 contains a number of DRRs, represented by numbered boxes, where box 1 represents DRR 1, box 2 represents DRR 2, etc. Three of the DRRs, 404, 406, and 408, are shown to illustrate that each training DRR may represent a slightly different view of the same organ (in this example, a lung) in different stages of deformation caused by patient breathing, for example. Each DRR has a known set of deformation parameters, which are mapped in to parameter space 400 as numbered circles, where circle number 1 represents the deformation parameters associated with DRR 1, circle number 2 represents the deformation parameters associated with DRR 2, and so on. Although parameter space 402 is shown in FIG. 4A as a three-dimensional space, parameter space 402 may be any number of dimensions. In one embodiment, the training DRRs and their associated parameters are calculated and stored during learning time. Thus, the elements in FIG. 4A represent data that is stored and processed during training, while FIGS. 4B through 4D show how that data is used during treatment.

Figure 4B:
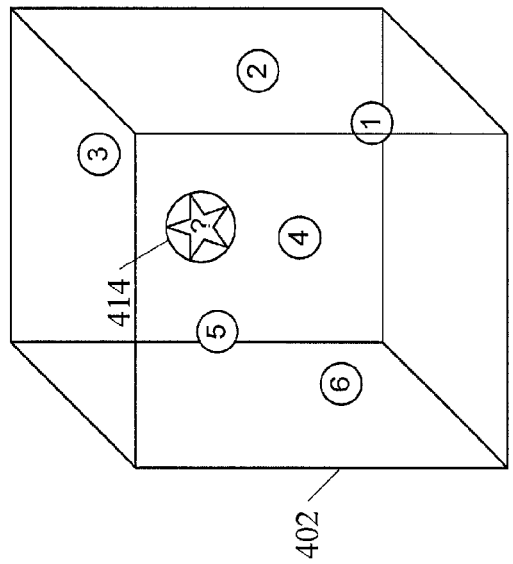
Figure 4B:
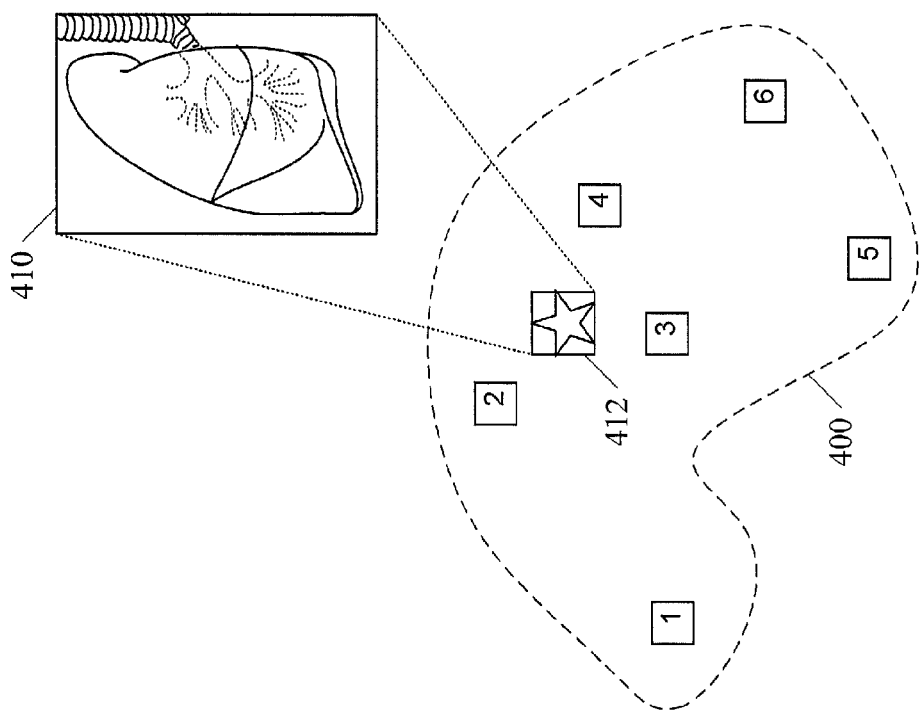

In FIG. 4B, a target radiograph 410 is taken during treatment. Its location within projection space 400 is represented by the square containing a star 412, which is located at an arbitrary location within projection space 400. REALMS attempts to determine the location of target radiograph 410 within parameter space 402, represented by the circle containing a star, referred to herein as starred circle 414. REALMS achieves this via interpolation at treatment time.

Figure 4C:
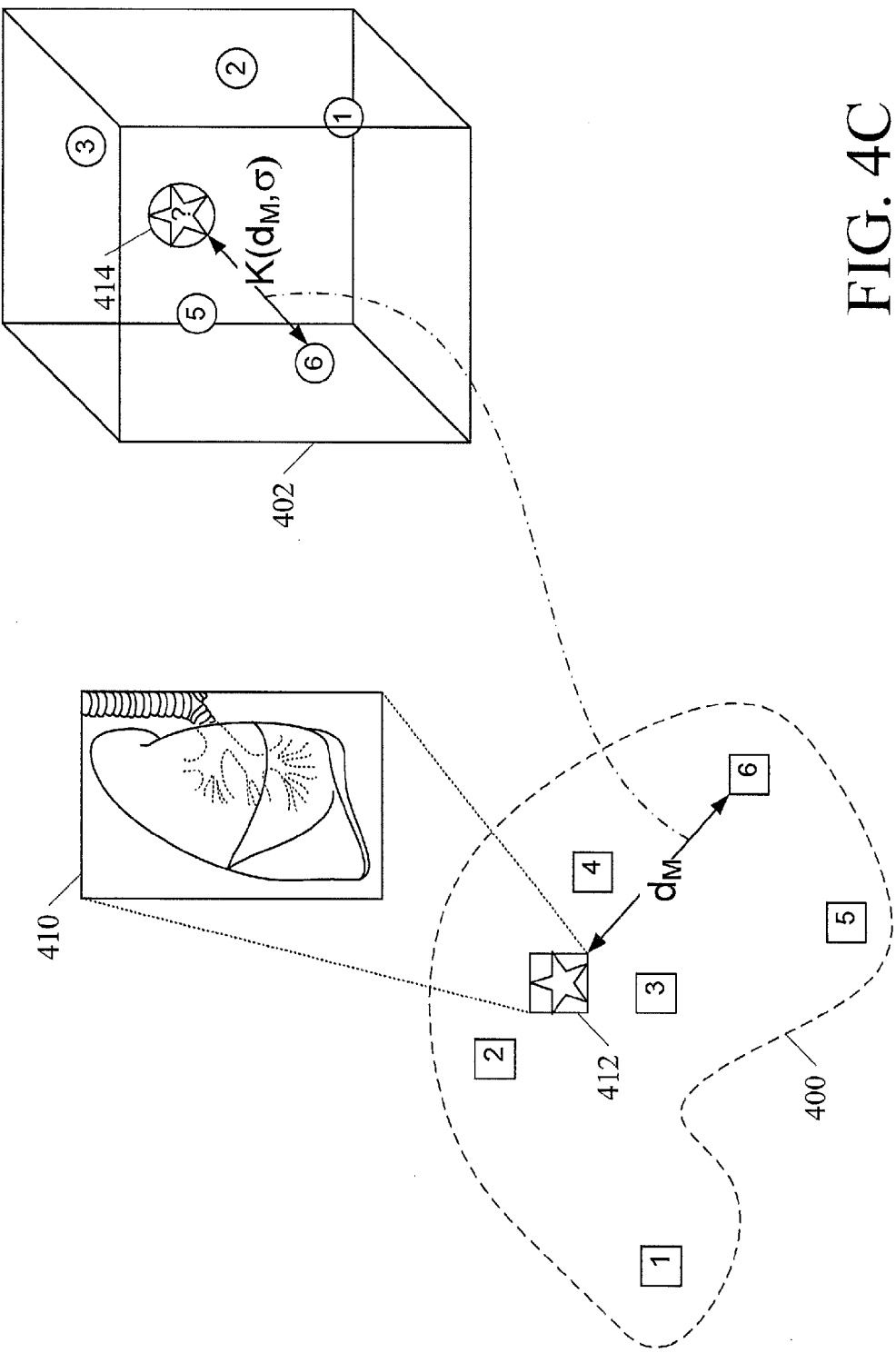

In FIG. 4C, a projection space distance metric, $d_M$, is used to determine a difference between target radiograph 410 and training DRRs, represented as the distance between the starred box representing target radiograph 410 and the other boxes within projection space 400. An interpolation weight function $\mathcal{K}(d_M, \sigma)$ is a function of projection distance to the training DRR, shown as the distance between the starred circle 414 and the other circles within parameter space 402. The measurement of distance in projection space 400 and the calculation of distance in parameter space 402 is repeated for multiple training DRRs, with the results shown in FIG. 4D.

Figure 4D:
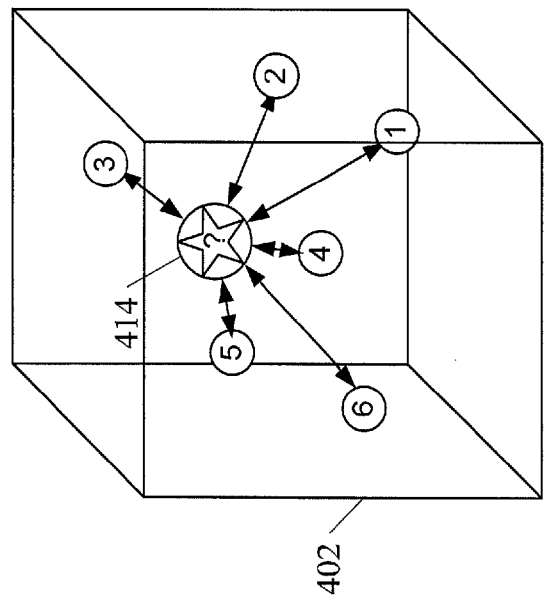
Figure 4D:
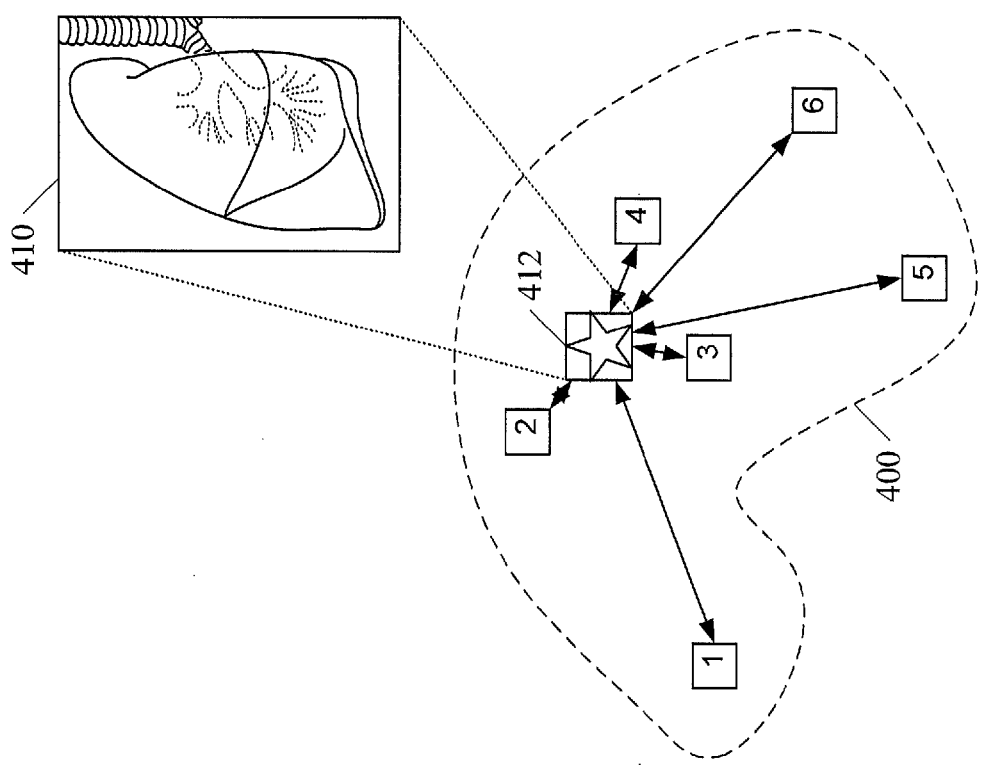

In FIG. 4D, the position of target radiograph 410 within parameter space 402 is established via multiple distance measurements within projection space 400 and interpolations of distance into parameter space 402. The set of parameter values represented by the location of starred circle 414 within parameter space 402 may then be used to deform a model of the structure of interest—in this example a lung—and present a reconstructed 3D image of the structure to a surgeon or other use during treatment time. In one embodiment, the 3D image may be presented as an augmented reality view of that deformed model to a surgeon or other user during treatment time.

This novel approach of using a distance metric in projection space to map to a location in parameter space and then using those parameters to deform a model of the structure in question allows registration to occur very quickly and accurately, with a mean target registration error of only 2.56±1.11 mm at 10.89±0.26 ms, or about 92 frames per second. As will be described in more detail below, metric tensor M and kernel width σ learning may be optimized via leave one out training.

The REALMS method will now be described in more detail. In this section, we describe REALMS's 2D/3D registration framework. REALMS uses kernel regression (eq. 1) to interpolate the patient's n 3D deformation parameters $c=(c^1, c^2, \ldots, c^n)$ separately from the on-board projection image $\Psi(\theta)$ where $\theta$ is the projection angle. It uses a Gaussian kernel $K_{M^i,\sigma^i}$ with the width $\sigma^i$ and a metric tensor $M^i$ on projection intensity differences to interpolate the patient's $i^{th}$ deformation parameter $c^i$ from a set of N training projection images $\{P(I \circ T(c_k); \theta) | k=1, 2, \ldots, N\}$ simulated at planning time. Specifically, the training projection image, $P(I \circ T(c_k); \theta)$, is the DRR of a 3D image deformed from the patient's planning-time 3D mean image $I$ with sampled deformation parameters $c_k = (c_k^1, c_k^2, \ldots, c_k^n)$. T and P are the warping and the DRR operators, respectively. P simulates the DRRs according to the treatment-time imaging geometry, e.g., the projection angle $\theta$.

In the treatment-time registration, each deformation parameter $c^i$ in c can be estimated with the following kernel regression:

$$c^i = \frac{\sum_{k=1}^{N} c_k^i \cdot K_{M^i,\sigma^i}(\Psi(\theta), P(I \cdot T(c_k); \theta))}{\sum_{k=1}^{N} K_{M^i,\sigma^i}(\Psi(\theta), P(I \cdot T(c_k); \theta))}, \quad (1)$$

$$K_{M^i,\sigma^i}(\Psi(\theta), P(I \cdot T(c_k); \theta)) = \frac{1}{\sqrt{2\pi}\,\sigma^i} e^{-\frac{d_{M^i}^2(\Psi(\theta), P(I \cdot T(c_k); \theta))}{s(\sigma^i)^2}}, \quad (2)$$

$$d_{M^i}^2(\Psi(\theta), P(I \cdot T(c_k); \theta)) = \quad (3)$$
$$(\Psi(\theta) - P(I \cdot T(c_k); \theta))^T M^i (\Psi(\theta) - P(I \cdot T(c_k); \theta)),$$

where $K_{M^i,\sigma^i}$ is a Gaussian kernel (kernel width=$\sigma^i$) that uses a Riemannian metric $M^i$ in the squared distance $d_{M^i}^2$ and gives the weights for the parameter interpolation in the regression. The minus signs in eq. 3 denote pixel-by-pixel intensity subtraction. We now describe how REALMS parameterizes the deformation space at planning time.

Deformation Modeling at Planning Time

REALMS limits the deformation to a shape space. It models deformations as a linear combination of a set of basis deformations calculated through PCA analysis. In our target problem—lung IGRT, a set of respiratory-correlated CTs (RCCTs, dimension: 512×512×120) $\{J_\tau | \tau=1, 2, 10\}$ are available at planning, time. From these a mean image $I=\bar{J}$ and a set of deformations $\phi_\tau$ between $J_\tau$ and $\bar{J}$ can be computed. The basis deformations can then be chosen to be the primary eigenmodes of a PCA analysis on the $\phi_\tau$.

Deformation Shape Space and Mean Image Generation. REALMS computes a respiratory Fréchet mean image $\bar{J}$ from the RCCT dataset via an LDDMM (Large Deformation Diffeomorphic Metric Mapping) framework described in Lorenzen et al. [11]. The Fréchet mean $\bar{J}$, as well as the diffeomorphic deformations φ from the mean $\bar{J}$ to each image $J_\tau$, are computed using a fluid-flow distance metric:

$$\bar{J} = \underset{J}{\operatorname{argmin}} \sum_{\tau=1}^{10} \int_0^1 \int_\Omega \|v_{\tau,\gamma}(x)\|^2 dx d\gamma + \frac{1}{s^2} \int_\Omega \|J(\phi_\tau^{-1}(x)) - J_\tau(x)\|^2 dx \quad (4)$$

where $J_\tau(x)$ is the intensity of the pixel at position x in the image $J_\tau$, $v_{\tau,\gamma}$ is the fluid-flow velocity field for the image $J_\tau$ in flow time γ, s is the weighting variable on the image dissimilarity, and $\phi_\tau(x)$ describes the deformation at the pixel location x: $\phi_\tau(x) = x + \int_0^1 v_{\tau,\gamma(x)} d\gamma$.

Statistical Analysis.

With the diffeomorphic deformation set $\{\phi_\tau | \tau = 1, 2, \ldots, 10\}$ calculated, our method finds a set of linear deformation basis vectors $\phi_{pc}{}^i$ by PCA analysis. The scores $\lambda_\tau^i$ on each $\phi_{pc}{}^i$ yield $\phi_\tau$ in terms of these basis vectors.

$$\phi_\tau = \bar{\phi} + \Sigma_{i=1}^{10} \lambda_\tau^i \cdot \phi_{pc}{}^i \quad (5)$$

We choose a subset of n eigenmodes that captures more than 95% of the total variation. Then we let the n scores form the n-dimensional parametrization c.

$$c = (c^1, c^2, \ldots c^n) = (\lambda^1, \lambda^2, \ldots \lambda^n) \quad (6)$$

For most of our target problems, n=3 satisfies the requirement. We now describe how REALMS learns the metric tensor $M^i$ and decides the kernel width $\sigma^i$.

Metric Learning at Planning Time

Metric Learning and Kernel Width Selection. REALMS learns a metric tensor $M^i$ with a corresponding kernel width $\sigma^i$ for the patient's $i^{th}$ deformation parameter $c^i$ using a LOO training strategy. At planning time, it samples a set of N deformation parameter tuples $\{c_k = (c_k^1, C_k^2, \ldots, c_k^n) | k=1, 2, \ldots, N\}$ to generate training projection images $\{P(I \circ T(c_k); \theta) | k=1, 2, \ldots, N\}$ where their associated deformation parameters are sampled uniformly within three standard deviations of the scores λ observed in the RCCTs. For each deformation parameter $c^i$ in c, REALMS finds the best pair of the metric tensor $M^{i\dagger}$ and the kernel width $\sigma_{i\dagger}$ that minimizes the sum of squared LOO regression residuals $\mathcal{L}_{c^i}$ among the set of N training projection images:

$$M^{i\dagger}, \sigma^{i\dagger} = \underset{M^i, \sigma^i}{\operatorname{argmin}} \mathcal{L}_{c^i}(M^i, \sigma^i), \quad (7)$$

$$\mathcal{L}_{c^i}(M^i, \sigma^i) = \sum_{k=1}^{N} (c_k^i - \hat{c}_k^i(M^i, \sigma^i))^2, \quad (8)$$

$$\hat{c}_k^i(M^i, \sigma^i) = \frac{\sum_{x \neq k} c_k^i \cdot K_{M^i, \sigma^i}(P(I \cdot T(c_k); \theta), P(I \cdot T(c_x); \theta))}{\sum_{x \neq k} K_{M^i, \sigma^i}(P(I \cdot T(c_k); \theta), P(I \cdot T(c_x); \theta))}, \quad (9)$$

where $\hat{c}_k^i(M^i, \sigma^i)$ is the estimated value for parameter $c_k^i$ interpolated by the metric tensor $M^i$ and the kernel width $\sigma^i$ from the training projection images X other than $\mathcal{K}$;; $M^i$ needs to be a positive semi-definite (p.s.d.) matrix to fulfill the pseudo-metric constraint; and the kernel width $\sigma^i$ needs to be a positive real number.

To avoid high-dimensional optimization over the constrained matrix $M^i$, we structure the metric tensor $M^i$ as a rank-1 matrix formed by a basis vector $\alpha^i : M^i = \alpha^i \alpha^{iT}$. Therefore, we can transform eq. 7 into a optimization over the unit vector $\alpha^i$ where $\|\alpha^i\|_2 = 1$:

$$\alpha^{i\dagger}, \sigma^{i\dagger} = \underset{\alpha^i, \sigma^i}{\operatorname{argmin}} \mathcal{L}_{c^i}(\alpha^i \alpha^{iT}, \sigma^i), \quad (10)$$

Then we can rewrite the squared distance $d_{M^i}{}^2 = d_{\alpha^i \alpha^{iT}}{}^2$ used in the Gaussian kernel $K_{M^i, \sigma^i}$ as follows:

$$d_{\alpha^i \alpha^{iT}}{}^2(P(I \circ T(c_k); \theta), P(I \circ T(c_x); \theta)) = (\alpha^{iT} \cdot r_{\mathcal{K}, \mathcal{X}})^T(\alpha^{iT} \cdot r_{\mathcal{K}, \mathcal{X}}), \quad (11)$$

$$r_{\mathcal{K}, \mathcal{X}} = P(I \circ T(c_k); \theta) - P(I \circ T(c_x); \theta), \quad (12)$$

where $r_{\mathcal{K}, \mathcal{X}}$ is a vector of intensity differences between projection images generated by parameters $c_\mathcal{K}$ and $c_\mathcal{X}$; and $\alpha^i$ is a metric basis vector where the magnitude of the inner product of $\alpha^i$ and the intensity difference vector $r_{\mathcal{K}, \mathcal{X}}$, $\alpha^{iT} \cdot r_{\mathcal{K}, \mathcal{X}}$ gives the Riemannian distance for the parameter $c^i$ (eq. 11).

The learned metric basis vector $\alpha^{i\dagger}$ and the selected kernel width $\sigma^{i\dagger}$ form a weighting kernel $K_{\alpha^{i\dagger} \alpha^{i\dagger T}, \sigma^{i\dagger}}$ to interpolate the parameter $c^i$ in the registration (see eq. 1).

Linear-Regression Implied Initial Metric.

Since the residual functional ζ (see eq. 7) that we want to minimize is non-convex, a good initial guess of the metric basis vector α is essential. Therefore, REALMS uses a vector $w^i$ as an initial guess of the metric basis vector $\alpha^i$ for the parameter $c^i$. Let $w = (w^1 w^2 \ldots w^n)$ list these initial guesses. The matrix W is approximated by a multivariate linear regression (eq. 13 and eq. 14) between the projection difference matrix $R = (r_1 r_2 \ldots r_N)^T$ and the parameter differences matrix ΔC. In particular, the projection difference vector $r_K = P(I \circ T(c_K); \theta) - P(I; \theta)$ is the intensity differences between the DRRs calculated from the deformed image $I \circ T(c_K)$ and the DRRs calculated from the mean image I (where c=0).

$$\Delta C = \begin{pmatrix} c_1^1 & c_1^2 & \cdots & c_1^n \\ c_2^1 & c_2^2 & \cdots & c_2^n \\ \vdots & \vdots & \ddots & \vdots \\ c_N^1 & c_N^2 & \cdots & c_N^n \end{pmatrix} - 0 \approx \begin{pmatrix} r_1^T \\ r_2^T \\ \vdots \\ r_N^T \end{pmatrix} \cdot (w^1 w^2 \ldots w^n), \quad (13)$$

$$W = (R^T R)^{-1} R^T \Delta C, \quad (14)$$

The inner product of the matrix W, calculated by the pseudo-inverse in eq. 14, and the projection intensity difference matrix R, $W^T R$, gives the best linear approximation of the parameter differences ΔC. Therefore, we use $w^i$ as the initial guess of the metric basis vector $\alpha^i$ for the parameter $c^i$.

Optimization Scheme.

REALMS uses a two-step scheme to optimize the metric basis vector $\alpha^i$ and the kernel width $\sigma^i$ in eq. 10.

First, for each candidate kernel width $\sigma^i$, it optimizes the metric basis vector $\alpha^i$ using the quasi-Newton method (specifically, the BFGS method) with the vector $w^i$ as the initialization. The gradient of the function $L_{c^i}$ with respect to $\alpha^i$ can be stated as $$\frac{\partial \mathcal{L}_{c^i}}{\partial \alpha^i} = \frac{\sqrt[2]{2}}{\sigma^i} \alpha^i \sum_{K=1}^{N} (\hat{c}_K^i - c_K^i) \sum_{X=1}^{N} (\hat{c}_X^i - c_X^i) \quad (15)$$

$$K_{\alpha^i \alpha^{iT}, \sigma^i}(P(I \cdot T(c_K); \theta), P(I \cdot T(c_X); \theta)) r_{(K, X)} r_{K, X}^T$$

Second, REALMS selects a kernel width $\sigma^{i\dagger}$ among the candidate kernel widths where its learned metric basis vector $\alpha^{i\dagger}$ yields minimum LOO regression residuals $\zeta_{c^i}$ for parameter $c^i$.

Projection Normalization.

To account for variations caused by x-ray scatter that produces inconsistent projection intensities, REALMS normalizes both the training projection images $P(I \circ T(c_{\mathcal{K}}); \theta)$ and the on-board projection image $\Psi(\theta)$. In particular, it uses a localized Gaussian normalization that has shown promise in removing the undesired scattering artifacts.

Results

Synthetic Tests.

We used coronal DRRs (dimension: 64×48) of the target CTs as synthetic on-board cone-beam projection images. The target CTs were deformed from the patient's Fréchet mean CT by normally distributed random samples of the first three deformation parameters. In our lung datasets, the first three deformation parameters captured more than 95% of lung variation observed in their RCCTs. We generated 600 synthetic test cases from 6 lung datasets and measured the registration quality by the average mTRE (mean Target Registration Error) over all cases and all voxels at tumor sites.

Figure 5:
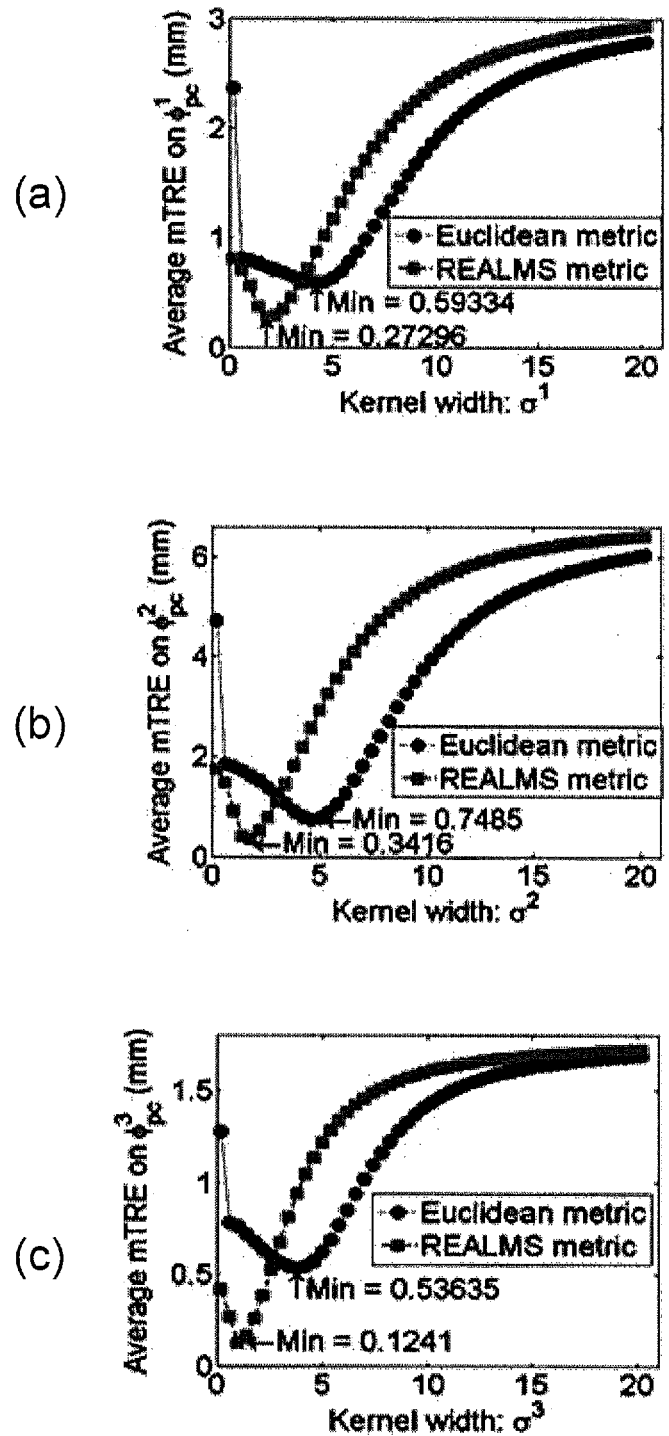
FIG. 5 shows the average mTRE over 600 test cases projected onto the (a) first, (b) second, and (c) third deformation basis vector versus the candidate kernel widths using N=125 training projection images according to an embodiment of the subject matter described herein.

With REALMS's registrations, the average mTRE and its standard deviation are down from 6.89±3.53 mm to 0.34±0.24 mm using N=125 training projection images. The computation time for each registration is 11.39±0.73 ms (87.79 fps) on Intel Corel Quad CPU Q6700. As shown in FIG. 5, REALMS reduces the minimum errors produced by kernel regressions that use the Euclidean metric ($M^i=I$). FIG. 5 shows the average mTRE over 600 test cases projected onto the (a) first, (b) second, and (c) third deformation basis vector versus the candidate kernel widths using N=125 training projection images.

Tradeoff of Time Versus Accuracy.

Figure 6:
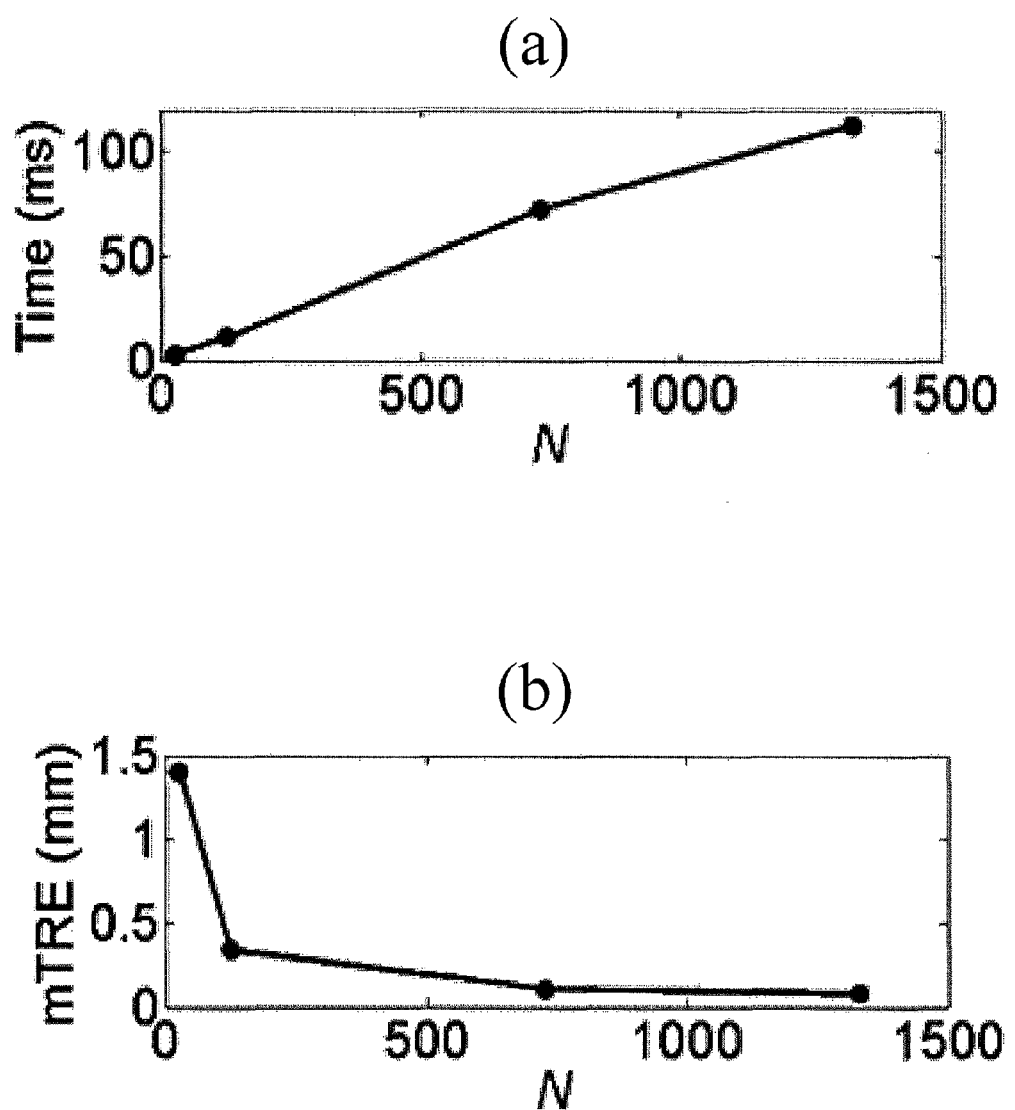
FIG. 6 shows the computation of (a) time and (b) registration accuracy tradeoff according to an embodiment of the subject matter described herein.

FIG. 6 shows the computation of (a) time and (b) registration accuracy tradeoff in REALMS. Tests showed that computation time scales fairly linearly with number of training projection images, taking about 40 ms to process 500 training images, and about 80 ms to process 1000 training images. Accuracy quickly improved from an mTRE of 1.5 mm for a few training images to ~0.3 mm for 125 training images. When more than 125 training images were used, however, accuracy improved at a lower rate, resulting in an mTRE of 0.25 mm for 500 training images and flattening out to about 0.1 mm after ~800 training images.

We tested REALMS on 6 lung datasets with an on-board CBCT system where a single coronal on-board CB projection (dimension downsampled to 64×48 for efficient computation) at both EE (End-Expiration) and EI (End-Inspiration) phases were used for the testing. For each dataset, we generated N=125 training DRRs to learn the metrics and select optimal interpolation kernel widths. The learned metrics and the selected kernel widths were used to estimate deformation parameters for the testing EE and EI on-board projections. The estimated CTs were deformed from Fréchet mean CT with the estimated deformation parameters. The results were validated with reconstructed CBCTs at target phases.

Table 1 shows the 3D tumor centroid differences (TCDs) between REALMS-estimated CTs and the reconstructed CBCTs at the same respiratory phases. Tumor centroids were computed via Snake active segmentations. As shown in table 1, REALMS reduces the TCD from 5.58±3.14 mm to 2.56±1.11 mm in 10.89±0.26 ms (91.82 fps). Numbers inside the parentheses are the initial TCDs.

TABLE 1

| dataset# | TCD at EE phase (mm) | TCD at EI phase (mm) | Time (ms) |
|---|---|---|---|
| 1 | 2.42 (9.70) | 4.06 (7.45) | 10.40 |
| 2 | 3.60 (4.85) | 3.60 (4.89) | 10.92 |
| 3 | 2.30 (8.71) | 3.60 (4.03) | 10.91 |
| 4 | 1.27 (2.69) | 2.80 (2.29) | 10.91 |
| 5 | 0.70 (9.89) | 3.28 (8.71) | 11.15 |
| 6 | 1.98 (2.03) | 1.12 (1.72) | 11.08 |

Figure 7:
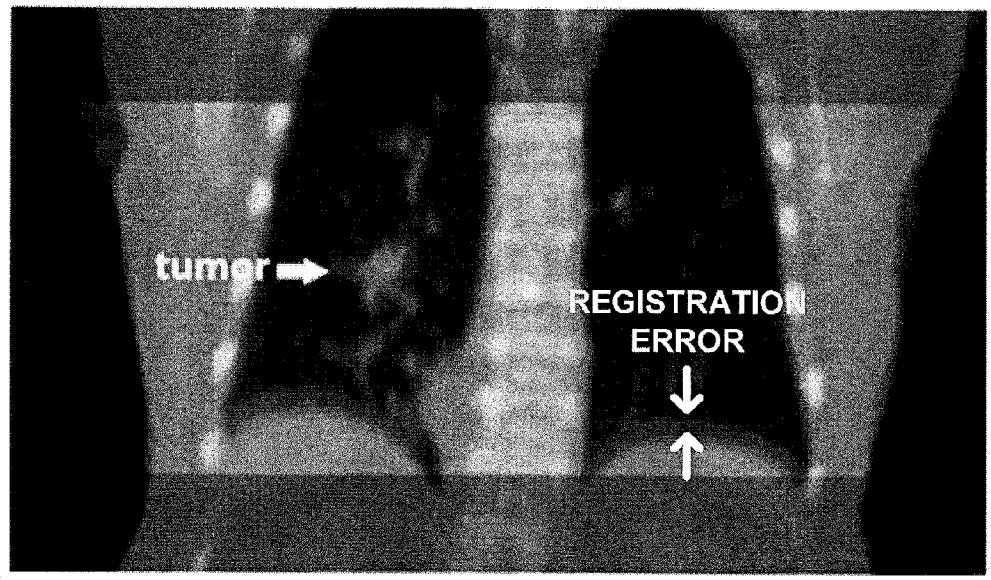
FIG. 7 illustrates an example REALMS registration on a lung dataset where the tumor, the diaphragm, and most of the soft tissues are correctly aligned.
Figure 7:
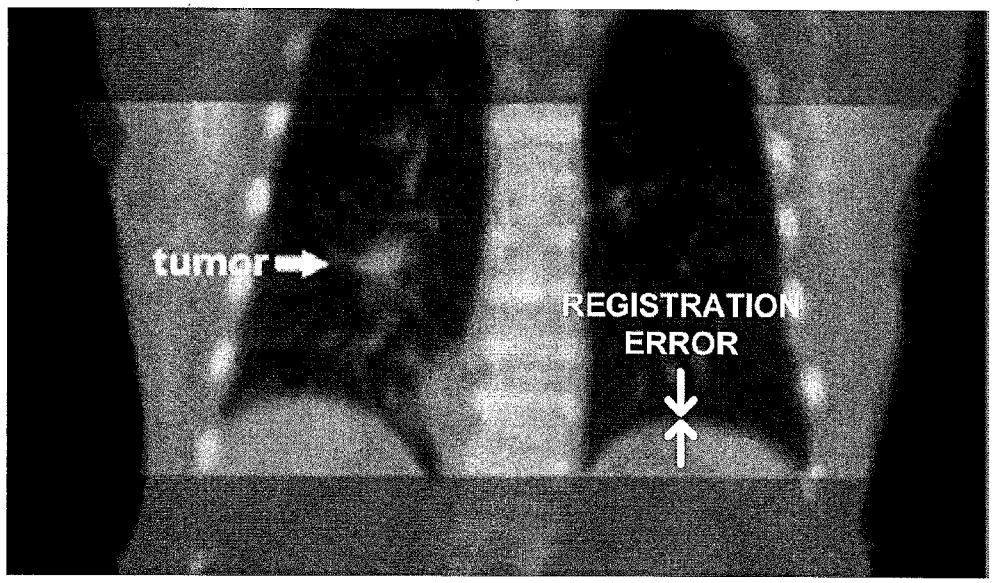

FIG. 7 illustrates an example REALMS registration on a lung dataset where the tumor, the diaphragm, and most of the soft tissues are correctly aligned. In FIG. 7, (a) is an image overlay of the reconstructed CBCT at EE phase and the Fréchet mean CT, and (b) is an image overlay of the reconstructed CBCT at EE phase and he REALMS-estimated CT calculated from on-board cone-beam projection image at EE phase. The lighter grey portions indicate where the two images match and the darker grey portions indicate with the two images mismatch. The registration error using conventional methods shown in (a) is visibly larger than the registration error using REALMS shown in (b).

The Learned Metric Basis Vector.

Figure 8:
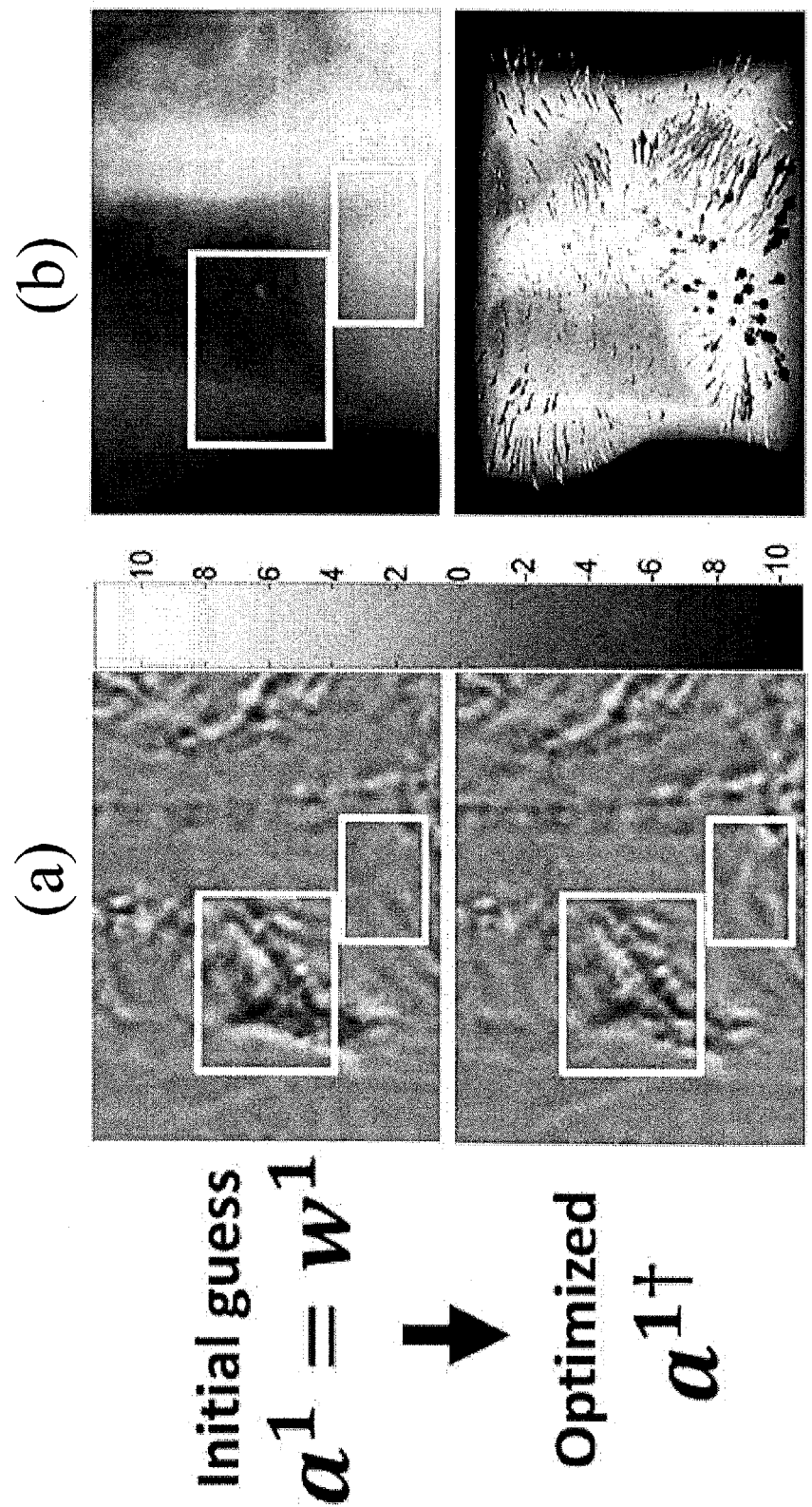
FIG. 8, shows that the learned metric basis vector correctly emphasizes projection pixels that are significant for the distance calculation of the deformation parameter according to an embodiment of the subject matter described herein.

As shown in FIG. 8, the learned metric basis vector $\alpha^{i\dagger}$ will emphasize projection pixels that are significant for the distance calculation of the deformation parameter $c^i$ (e.g. give high positive or high negative values). Results showed that the learned metric basis vector $\alpha^{i\backslash}$ emphasized the diaphragm locations and the lung boundaries as its corresponding deformation basis vector $\phi_{pc}^{1}$ covers the expansion and contraction motion of the lung. In FIG. 8, (a) shows the initial guess of the metric basis vector $\alpha^1 = w^1$ (top) and the optimized metric basis vector $\alpha^{1\dagger}$ (bottom) of a lung dataset. They are reshaped into projection image domain for visualization. As can be seen in FIG. 8, the diaphragm locations and the lung boundaries (white boxes) were emphasized after metric learning. In FIG. 8, (b) top shows a coronal on-board CB projection at EE phase of the lung dataset used in FIG. 8 (*a*). The white boxes in (a) and (b) correspond to the same 2D locations. In FIG. 8, (b) bottom shows the first deformation basis vector $\phi_{pc}^{1}$ (the arrows indicate heat maps of the deformation magnitudes) overlaid with the volume rendering of the Fréchet mean CT of the lung dataset used in FIG. 8 (*a*). For this dataset, $\phi_{pc}^{1}$ covers the expansion and contraction motion of the lung.

CONCLUSION

The subject matter described herein presents an accurate and real-time 2D/3D registration method, REALMS, that estimates 3D deformation parameters from a single projection image using kernel regressions with learned rank-1 projection distance metrics. The learned distance metrics that are optimized with an initialization approximated by linear regression results in success for this high dimensional metric learning, and avoids convergence to local minima and the wrong distance metrics that would result. With this initialization, the regression estimation on both synthetic and real test cases are well suited for real-time and low-dose IGRT by using a single projection image.

The disclosure of each of the following references is incorporated herein by reference in its entirety:
1. Russakoff, D., Rohlfing, T., Maurer, C.: Fast intensity-based 2D-3D image registration of clinical data using light fields. In: Computer Vision, 2003. Proceedings. Ninth IEEE International Conference on. Volume 1. (2003) 416-422
2. Russakoff, D. B., Rohlfing, T., Mori, K., Rueckert, D., Ho, A., Adler, J. R., Maurer, C. R.: Fast generation of digitally reconstructed radiographs using attenuation fields with application to 2d-3d image registration. IEEE Transactions on Medical Imaging 24 (2005) 1441-1454
3. Khamene, A., Bloch, P., Wein, W., Svatos, M., Sauer, F.: Automatic registration of portal images and volumetric CT for patient positioning in radiation therapy. Medical Image Analysis 10 (2006) 96-112
4. Munbodh, R., Jaffray, D. A., Moseley, D. J., Chen, Z., Knisely, J. P. S., Cathier, P., Duncan, J. S.: Automated 2d-3d registration of a radiograph and a cone beam CT using line-segment enhancement. Medical Physics 33 (2006) 1398-1411
5. Li, R., Jia, X., Lewis, J. H., Gu, X., Folkerts, M., Men, C., Jiang, S. B.: Real-time volumetric image reconstruction and 3d tumor localization based on a single x-ray projection image for lung cancer radiotherapy. Medical Physics 37 (2010) 2822-2826
6. Li, R., Lewis, J. H., Jia, X., Gu, X., Folkerts, M., Men, C., Song, W. Y., Jiang, S. B.: 3d tumor localization through real-time volumetric x-ray imaging for lung cancer radiotherapy. Medical Physics 38 (2011) 2783-2794
7. Chou, C R., Frederick, B., Chang, S., Pizer, S.: A Learning-Based patient repositioning method from Limited-Angle projections. In: Brain, Body and Machine. Volume 83 of Advances in Soft Computing. Springer (2010) 83-94
8. Chou, C. R., Frederick, B., Liu, X., Mageras, G., Chang, S., Pizer, S.: Claret: A fast deformable registration method applied to lung radiation therapy. In: Fourth International (MICCAI) Workshop on Pulmonary Image Analysis. (2011) 113-124
9. Miao, S., Liao, R., Zheng, Y.: A hybrid method for 2-d/3-d registration between 3-d volumes and 2-d angiography for trans-catheter aortic valve implantation (TAVI). In: ISBI. (2011) 1215-1218
10. Weinberger, K., Tesauro, G.: Metric learning for kernel regression. In: Eleventh international conference on artificial intelligence and statistics. (2007) 608-615
11. Lorenzen, P., Prastawa, M., Davis, B., Gerig, G., Bullitt, E., Joshi, S.: Multi-modal image set registration and atlas formation. Medical Image Analysis 10(3) (2006) 440-451

It will be understood that various details of the subject matter described herein may be changed without departing from the scope of the subject matter described herein. Furthermore, the foregoing description is for the purpose of illustration only, and not for the purpose of limitation.

What is claimed is:

1. A method for real-time 2D/3D deformable registration using metric learning, the method including:
   (a) creating a catalogue of simulated 2D projection images based on a reference 3D image and a shape space of 3D deformations, wherein each entry in the catalogue is created by: applying to the reference 3D image a set of deformation parameters from the shape space of deformations; simulating a 2D projection of the result; associating the simulated 2D projection image with the deformation parameters used to create the simulated 2D projection image; and storing the simulated 2D projection image and associated deformation parameters in the catalogue;
   (b) receiving a 2D image, and, in response to receiving the 2D image: calculating a value of distance between the received 2D image and a simulated 2D projection image for each of the simulated 2D projection images in the catalogue; using the calculated distances to calculate weighting factors to be applied to the deformation parameters of each of the simulated 2D projection images in the catalogue; and calculating 3D deformation parameters inferred from the received 2D image based on the weighted deformation parameters; and
   (c) using the calculated deformation parameters to deform a 3D volume of interest to produce a 3D volume that represents the 3D layout of the tissue at the time that the received 2D image was acquired.

2. The method of claim 1 comprising learning inter-projection-image distance metrics that measure weighting factors on the 3D deformation parameters using the catalogue created in step (a).

3. The method of claim 2 wherein using the calculated distances to create weighting factors to be applied to the deformation parameters of each of the simulated 2D projection images in the catalogue includes using learned projection metrics.

4. The method of claim 3 wherein the learned projection metrics are learned at least one of:
   performing linear regressions to learn the relation between Euclidean inter-projection-image distance metrics and respective deformation parameter values; and
   performing a leave-one-out analysis that optimizes, over Riemannian metrics, the accuracy of the prediction of the deformation parameter values of left-out projection images.

5. The method of claim 1 wherein step (a) is performed prior to treatment time, wherein steps (b) and (c) are performed during treatment time, and wherein the received 2D image is an image acquired during treatment time.

6. The method of claim 5 comprising using the produced 3D image volume to inform or adjust treatment during treatment time.

7. The method of claim 6 comprising using the deformed 3D volume of interest during treatment to calculate at least one of:
   locations within target tissue being treated;
   locations within radiosensitive non-target tissue being irradiated;
   dose accumulation on the target tissue being treated; and
   dose accumulation on the non-target tissue being irradiated.

8. The method of claim 5 wherein the catalogue of simulated 2D projection images includes images simulated from a projection angle that essentially matches the anticipated angle of projection of images to be acquired at treatment time.

9. The method of claim 1 wherein the catalogue of simulated 2D projection images includes images from a plurality of projection angles relative to the reference 3D image.

10. The method of claim 1 wherein the shape space of 3D deformations comprises a set of deformation parameters that characterize a range of reasonable deformations that the volume of interest may undergo.

11. The method of claim 1 wherein the shape space of 3D deformations is determined based on measurements taken of actual patient anatomy under different deformation conditions.

12. The method of claim 11 wherein determining the shape space of 3D deformations includes performing principal component analysis on the measurements to identify a set of modes of deformation and wherein the deformation parameters comprise scores on the set of modes of deformation.

13. The method of claim 1 wherein calculating deformation parameters for the received 2D image based on the weighted deformation parameters in the catalogue comprises calculating the deformation parameters for the received 2D image as a sum of the weighted deformation parameters in the catalogue.

14. A system for real-time 2D/3D deformable registration using metric learning, the system including:
a data store for storing a catalogue of simulated 2D projection images that were created based on a reference 3D image and a shape space of 3D deformations, wherein each entry in the catalogue was computed by: applying to the reference 3D image a set of deformation parameters from the shape space of deformations; simulating a 2D projection of the result; associating the simulated 2D projection image with the deformation parameters used to create the simulated 2D projection image; storing the simulated 2D projection image and associated deformation parameters in the catalogue; and learning inter-projection-image distance metrics that measure weighting factors on the 3D deformation parameters using the created catalogue; and
an image processing module for receiving a 2D image, and, in response to receiving the 2D image: calculating a value of distance between the received 2D image and a simulated 2D projection image for each of the simulated 2D projection images in the catalogue; using the calculated distances to calculate weighting factors to be applied to the deformation parameters of each of the simulated 2D projection images in the catalogue; calculating deformation parameters for the acquired 2D image based on the weighted deformation parameters in the catalogue; and using the calculated deformation parameters to deform a 3D volume of interest to produce a 3D volume that represents 3D layout of the tissue at the time that the received 2D image was acquired.

15. The system of claim 14 comprising an image acquisition module for acquiring the 2D image and providing the acquired 2D image to the image processing module.

16. The system of claim 14 wherein the simulated 2D projection images are stored into the catalogue prior to treatment time of the tissue being treated, wherein the image processing module receives the 2D image, calculates distance values, calculates weighting factors, calculates deformation parameters, and deforms the 3D volume during treatment time.

17. The system of claim 16 wherein the image processing module uses the produced 3D image volume to inform or adjust treatment during treatment time.

18. The system of claim 17 the image processing module uses the deformed 3D volume of interest during treatment to calculate at least one of:
locations within target tissue being treated;
locations within radiosensitive non-target tissue being irradiated;
dose accumulation on the target tissue being treated; and
dose accumulation on the non-target tissue being irradiated.

19. The system of claim 16 wherein the catalogue of simulated 2D projection images includes images calculated from a projection angle that essentially matches the anticipated angle of projection of images to be acquired at treatment time.

20. The system of claim 14 wherein the catalogue of simulated 2D projection images includes images from a plurality of projection angles relative to the reference 3D image.

21. The system of claim 14 wherein the shape space of 3D deformations comprises a set of deformation parameters that characterize a range of reasonable deformations that the volume of interest may undergo.

22. The system of claim 14 wherein the shape space of 3D deformations is determined based on measurements taken of actual patient anatomy under different deformation conditions.

23. The system of claim 22 wherein determining the shape space of 3D deformations includes performing principal component analysis on the measurements to identify a set of modes of deformation and wherein the deformation parameters comprise scores on the set of modes of deformation.

24. The system of claim 14 wherein the image processing module learns inter-projection-image distance metrics that measure weighting factors on the 3D deformation parameters using the catalogue of simulated 2D projection images.

25. The system of claim 24 wherein using the calculated distances to create weighting factors to be applied to the deformation parameters of each of the simulated 2D projection images in the catalogue includes using learned projection metrics.

26. The system of claim 24 wherein the learned projection metrics are learned by at least one of:
performing linear regressions to learn the relation between Euclidean inter-projection-image distance metrics and respective 3D deformation parameter values; and
performing a leave-one-out analysis that optimizes, over Riemannian metrics, the prediction of the 3D deformation parameter values of left-out projection images.

27. The system of claim 14 wherein calculating deformation parameters for the received 2D image based on the weighted deformation parameters in the catalogue comprises calculating the deformation parameters for the received 2D image as a sum of the weighted deformation parameters in the catalogue.

28. A non-transitory computer readable medium having stored thereon executable instructions that when executed by the processor of a computer control the computer to perform steps comprising:
creating a catalogue of simulated 2D projection images based on a reference 3D image and a shape space of 3D deformations, wherein each entry in the catalogue is created by: applying to the reference 3D image a set of deformation parameters from the shape space of deformations; simulating a 2D projection of the result; associating the simulated 2D projection image with the deformation parameters used to create the simulated 2D projection image; and storing the simulated 2D projection image and associated deformation parameters in the catalogue;
receiving a 2D image, and, in response to receiving the 2D image: calculating a value of distance between the received 2D image and a simulated 2D projection image for each of the simulated 2D projection images in the catalogue; using the calculated distances to calculate weighting factors to be applied to the deformation parameters of each of the simulated 2D projection images in the catalogue; and calculating deformation parameters for the received 2D image based on the weighted deformation parameters in the catalogue; and using the calculated deformation parameters to deform a 3D volume of interest to produce a 3D volume that represents the 3D layout of the tissue at the time that the received 2D image was acquired.

* * * * *